(12) United States Patent
Niles

(10) Patent No.: US 7,244,470 B2
(45) Date of Patent: Jul. 17, 2007

(54) PROTECTION OF ELECTRICAL POWER SYSTEMS

(75) Inventor: Martin S. Niles, Lac La Biche (CA)

(73) Assignee: Cantega Technologies Inc., Edmonton (CA)

( * ) Notice: Subject to any disclaimer, the term of this patent is extended or adjusted under 35 U.S.C. 154(b) by 0 days.

(21) Appl. No.: 10/895,363

(22) Filed: Jul. 21, 2004

(65) Prior Publication Data

US 2004/0265497 A1    Dec. 30, 2004

Related U.S. Application Data

(63) Continuation-in-part of application No. 09/902,375, filed on Jul. 10, 2001, now abandoned.

(51) Int. Cl.
*B05D 5/00* (2006.01)

(52) U.S. Cl. ............... 427/421.1; 427/422; 427/426; 427/427; 427/427.5; 118/313; 118/323

(58) Field of Classification Search ........... 427/421.1, 427/422, 426, 427, 427.5; 118/313, 323
See application file for complete search history.

(56) References Cited

U.S. PATENT DOCUMENTS

| | | | | |
|---|---|---|---|---|
| 4,095,404 A | * | 6/1978 | Babayan ............... | 57/297 |
| 4,479,990 A | * | 10/1984 | Dixon et al. .......... | 428/36.9 |
| 4,943,448 A | * | 7/1990 | Lacourciere ......... | 427/58 |
| 5,284,888 A | * | 2/1994 | Morgan ................ | 524/93 |
| 5,532,304 A | * | 7/1996 | Miyazaki et al. ..... | 524/261 |
| 6,169,160 B1 | * | 1/2001 | MacQueen et al. ... | 528/310 |
| 2003/0035885 A1 | * | 2/2003 | Zang et al. ........... | 427/58 |

* cited by examiner

*Primary Examiner*—Alain L. Bashore

(57) ABSTRACT

A method and apparatus for protecting electrical power transmissions systems that may or may not be energized. A two part resin composition acting as a dielectric material is distributed on electrical power systems at a location close to the transmissions systems. The dielectric material has dielectric properties suitable for protecting the desired areas in the solid form and that allow for safe application in the liquid form. The dielectric material can be distributed before installation of the electric lines or can be retrofitted to existing installations.

15 Claims, 6 Drawing Sheets

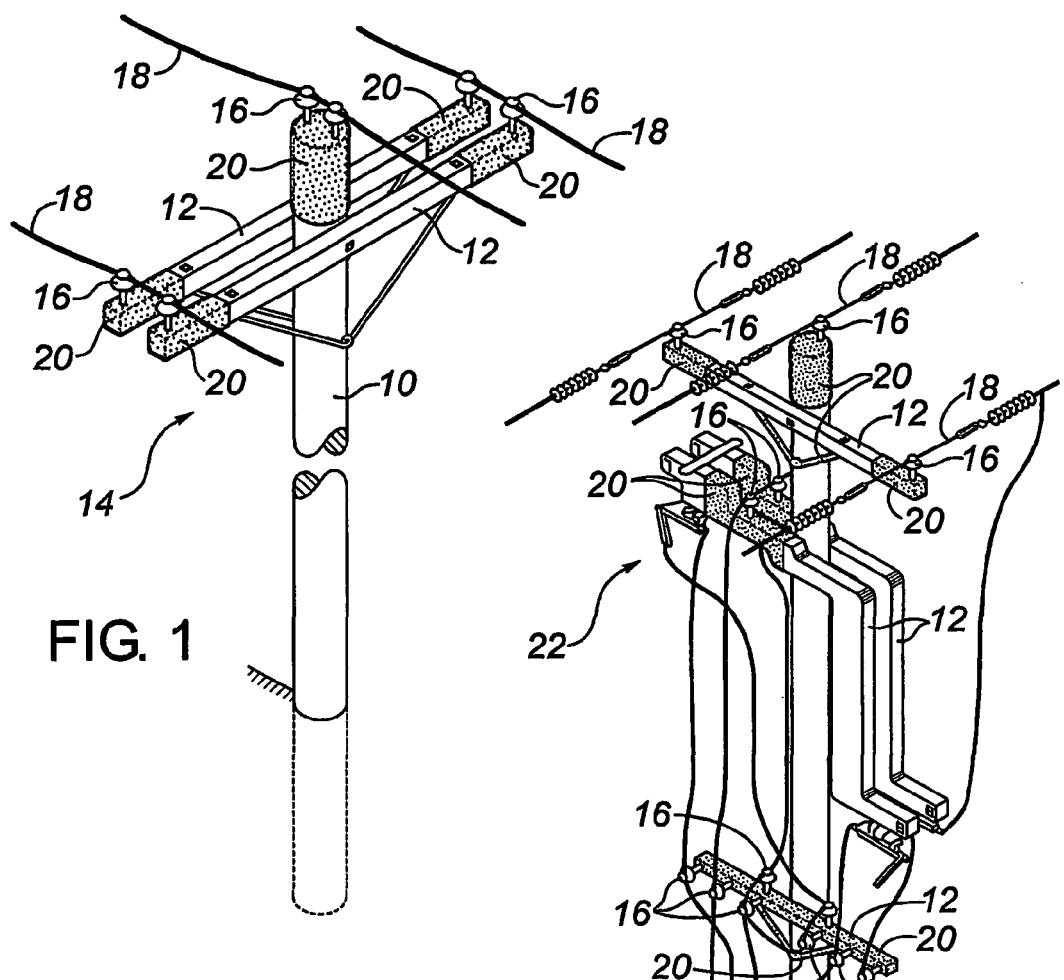
FIG. 1
FIG. 2
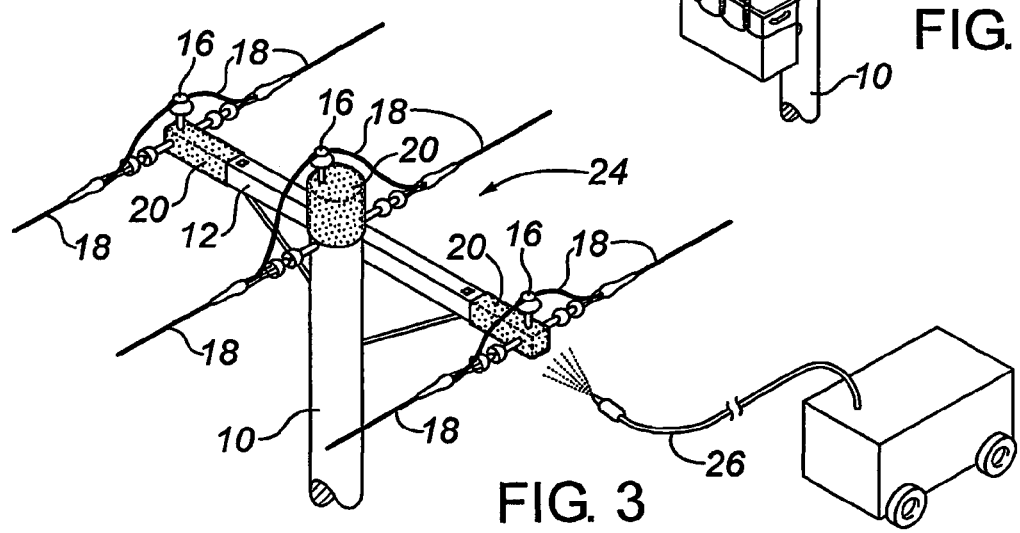
FIG. 3

PROTECTION OF ELECTRICAL POWER SYSTEMS

CROSS-REFERENCE TO RELATED APPLICATIONS

This application is a continuation-in-part of U.S. application Ser. No. 09/902,375 filed Jul. 10, 2001, abandoned.

BACKGROUND OF THE INVENTION

The invention relates to the field of electrical power transmission and distribution and the need to insulate electrical power lines from short circuits caused by birds and other animals. More particularly, the invention relates to an insulation method and material for coating selected portions of the structures supporting wires such as electrical transmission lines and related components.

Long-distance electricity transmission is typically carried with high voltage conductors. Higher voltages reduce resistance power loss, and line voltage for long distance lines is stepped up with generating stations at selected locations. Transmission lines traverse large regions and require numerous support towers. The conductors in high tension powerlines are typically uninsulated because of the cost and additional weight of insulated versus uninsulated conductors.

Electric poles and towers provide attractive roosts for birds, particularly in treeless regions. If the wings of a bird simultaneously contact a transmission line and another object such as an adjacent wire, support tower or tree, the resulting electrical short-circuit can kill the bird and also damage the power system. The electrical short can further cause electrical system damage resulting in power outages. Because large (and typically protected) birds are more susceptible to such incidental contact, electrocution hazards disproportionately affect large bird species such as raptors.

The variety and number of proposed solutions for repelling birds and other animals from electrocution risks highlights the persistence and magnitude of the problems created by such undesirable intrusion. Many different types of scarecrows and other moving devices have been developed to repel birds. For example, U.S. Pat. No. 4,131,079 to Rousseau et al. (1978) disclosed a wind operable scarecrow. U.S. Pat. No. 4,185,581 to Tilton (1980) disclosed a weight responsive perch for scaring birds. U.S. Pat. No. 4,597,357 to LeMessurier (1986) disclosed a movable aluminium sheet for scaring birds. U.S. Pat. No. 4,598,660 to Konzak (1986) disclosed an air gun for releasing a gas stream to scare birds. U.S. Pat. No. 4,656,770 to Nuttle (1987) disclosed a tiger cat weathervane. U.S. Pat. No. 4,937,988 to Gratton et al. (1990) disclosed a barrier to birds formed with monofilament line. U.S. Pat. No. 4,962,619 to Chatten (1990) disclosed a coiled wire having movable elongate flaps. U.S. Pat. Nos. 5,343,651 (1994) and 5,452,536 (1995) to Chatten disclosed a rotating carriage propelled by wind for repelling birds. U.S. Pat. No. D0359099 to Sugimoto (1995) disclosed a windmill for scaring birds, and U.S. Pat. No. 5,713,160 to Heron (1998) disclosed a retractable bird deterring device.

In addition to moving devices, various physical structures have been developed to discourage birds from roosting on structures. U.S. Pat. No. 3,407,550 to Shaw et al. (1968) disclosed spikes attached to a mounting structure. U.S. Pat. No. 4,269,008 to Assouline (1981) disclosed optical pyramid structures for generating prisms to scare birds. U.S. Pat. No. 4,845,307 to Cumming et al. (1989) disclosed a high density polyethylene wildlife guard for shielding electrical conductors at the point of attachment to an insulator bushing, and further described prior difficulties in creating an effective physical guard for such conductors. U.S. Pat. No. 5,058,335 to Richter (1991) disclosed flexible plastic fingers attachable to a wire for deterring birds. U.S. Pat. No. 5,092,088 to Way (1992) disclosed a bird deterring device having retractable wires. U.S. Pat. No. 5,253,444 to Donoho et al. (1993) disclosed a base having spikes for repelling birds, and U.S. Pat. No. 5,433,029 to Donoho et al. (1995) disclosed a channel member for clamping onto an electrical wire. U.S. Pat. No. 5,400,552 to Negre (1995) disclosed a channel base having multiple spikes for repelling birds. U.S. Pat. No. 5,454,183 to Antonini et al. (1995) disclosed a resilient base engaged with two wire mesh sections for repelling birds. U.S. Pat. No. 5,691,032 to Trueblood et al. (1997) disclosed a base having a plurality of bird repelling slots and arms extending from the base. U.S. Pat. No. 5,606,830 to Townsend, Jr. et al. disclosed grid fencing panels for attachment to electric cables or wires. U.S. Pat. No. 6,250,023 to Donoho (2001) disclosed a base having spikes for discouraging birds.

Other bird repelling concepts use electricity or magnetics to discourage bird intrusion. U.S. Pat. No. 5,255,896 to Letarte et al. (1993) disclosed an electrified fence for repelling birds. U.S. Pat. No. 5,353,543 to Teraoka (1994) disclosed a rotating magnetic field for repelling birds. U.S. Pat. No. 5,666,767 to Ohba (1997) disclosed a magnet activated by the weight of a bird to generate a bird discouraging magnetic field. U.S. Pat. No. 5,648,641 to Guthrie (1997) disclosed an electrostatically charged animal barrier. U.S. Pat. No. 5,884,426 to Ishida (1999) disclosed a wind movable magnet for generating a bird discouraging magnetic field. U.S. Pat. No. 6,006,698 to Negre (1999) disclosed electrified rails for generating vibrations for discouraging birds. U.S. Pat. No. 6,016,100 to Boyd et al. (2000) disclosed a device for generating an oscillating ultrasonic animal deterrent signal. U.S. Pat. No. 6,250,255 to Lenhardt et al. (2001) disclosed techniques which pulsated microwaves or sound waves to repel birds.

Shield and cage devices have been specifically designed to restrict birds and other animals from short-circuiting electrical leads. For example, U.S. Pat. No. 4,845,307 to Cumming et al. (1989) disclosed a high density polyethylene skirt for covering insulator bushings. U.S. Pat. No. 5,153,383 to Whited et al. (1992) disclosed a flexible sheet of PVC material attached with VELCRO strips for shielding electrical equipment. U.S. Pat. No. 6,005,196 to Spillyards (1999) disclosed a spring biased cage for covering an insulator bushing. U.S. Pat. No. 5,864,096 to Williams et al. (1999) disclosed a wildlife guard comprising a disk. U.S. Pat. No. 6,248,956 to Cook et al. (2001) disclosed an annular guard for shielding a high voltage insulator.

Materials have been developed to resist animal damage. In one example, U.S. Pat. No. 5,997,894 to Blum et al. (1999) disclosed a coating composition resistant to animals which comprised a hard, ceramic particle laden material for protecting underground wires and cables from rodents.

Various chemicals have been used to repel birds from an area or structure. U.S. Pat. No. 3,734,875 to Sekuler (1973) disclosed an aerosol bird repellent. U.S. Pat. No. 4,693,889 to Chirchirillo et al. (1987) disclosed a bird repellent composition formulated to limit stains to the structure treated. U.S. Pat. No. 5,196,451 to Greig-Smith et al. (1993), U.S. Pat. No. 5,296,226 to Askham (1994), and U.S. Pat. No. 5,549,902 to Preiser et al. (1996) disclosed other bird repellent compositions.

U.S. Pat. No. 6,226,933 to Nelson et al. disclosed a configurable sheath for protecting structures such as wires wherein the sheath could incorporate passive or active components (such as chemical repellents) for repelling animals such as birds. Nelson et al. disclosed spikes, engaged with a protective sheath, which released a noxious chemical following activation of the spikes by a bird or other animal. Nelson further disclosed that the spikes could be attached to the structure or integrated within a base material attached to the structure.

Another technique using chemical compounds to repel birds was disclosed in U.S. Pat. No. 4,873,082 to Cacioli et al. (1989) wherein a multi-layer coating comprised a brittle, polystyrene protective cover over a tacky, bird repellent layer. The outer layer prevented the accumulation of dust on the inner tacky layer. When the brittle protective cover was disturbed by a bird a noxious, bird repellent composition was released to repel the intruding bird.

The variety and number of these efforts indicate significant problems in the exclusion of birds from undesirable areas, and the inherent difficulties in effectively accomplishing such exclusion. Many of these techniques are expensive to employ and are ineffective in preventing birds from landing in a particular spot. A need exists for an improved method and apparatus capable of resisting electrical wire short circuits deleterious to birds and other animals.

SUMMARY OF THE INVENTION

There is therefore provided, according to an aspect of the invention, a method of protecting electrical power transmissions systems, for example that conduct voltages in the range of 10 KV to 60 KV, from damage. The method comprising the steps of mixing a two part resin composition such as a composition formed from polyurethane and polyurea at the point of use to form a liquid composite, applying the liquid composite to a component of an electrical power transmission system, and curing the liquid composite to form a coating for the component.

According to a further aspect of the invention, there is provided a further method of protecting electrical power transmissions systems from damage. The method comprises the steps of identifying an area of the electrical power transmissions system to be protected; selecting a dielectric material having a liquid form and a solid form, where the dielectric material has dielectric properties suitable for protecting the identified areas in the solid form, and where the dielectric material has dielectric properties suitable to allow for safe application in the liquid form; applying the dielectric material in the liquid form to the identified areas; and allowing the dielectric material to convert from the liquid form to the solid form. An applicator may be used to apply the dielectric material comprising a dielectric material supply connected to a delivery sub-system.

The methods as described may be carried out at an electric power sub-station using portable equipment, and may be applied to an electrified component of an electrical power transmission system. The method may further comprise the step of calculating a desired dielectric constant of the coating and applying a corresponding thickness of the liquid composite.

According to a further aspect of the invention, an applicator for applying the liquid composite is provided. The applicator comprises a mix chamber, a first supply for a first part of a two part resin composition, the first supply communicating with the static mix tube, a second supply for a second part of the two part resin composition, the second supply communicating with the static mix tube, pumps for driving fluid from the supplies into the mix chamber, and a delivery sub-system for receiving fluid from the mix chamber.

According to a further aspect of the invention, an applicator for applying the liquid composite is provided. The applicator comprises a static mix tube, a first supply chamber for a first part of a two part resin composition, the first supply chamber communicating with the static mix tube, a second supply chamber for a second part of the two part resin composition, the second supply chamber communicating with the static mix tube, pumps for driving fluid from the supply chambers into the static mix tube, and a delivery sub-system for receiving fluid from the static mix tube.

BRIEF DESCRIPTION OF THE DRAWINGS

There will now be given a brief description of preferred embodiments of the invention, with reference to the drawings, by way of illustration only and not limiting the scope of the invention, in which like numerals refer to like elements, and in which:

FIG. 1 illustrates a support structure for carrying high voltage electrical wires.

FIG. 2 illustrates another form of support structure.

FIG. 3 illustrates another form of support structure and a sprayer for distributing dielectric material on the selected portions of the support and wires.

DESCRIPTION OF THE PREFERRED EMBODIMENTS

Figure 5:
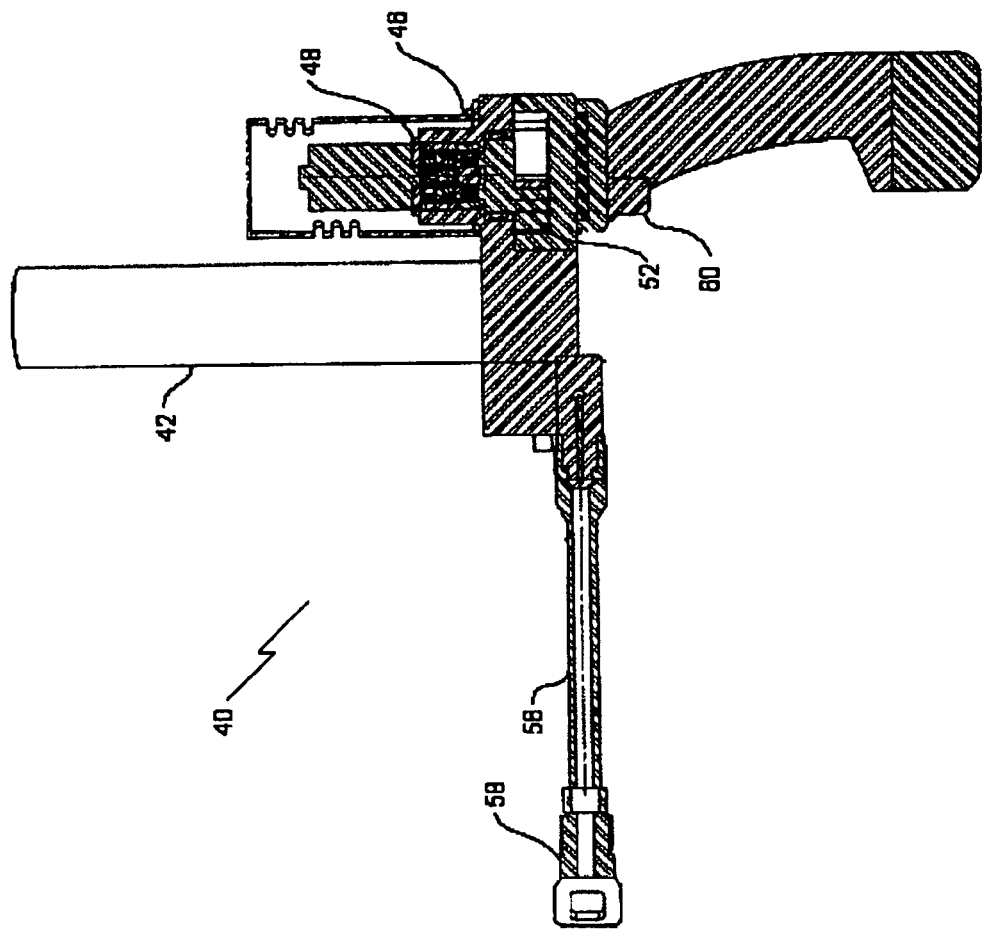
FIG. 5 is a side elevation view in section view of the applicator illustrated in FIG. 4

In the claims, the word "comprising" is used in its inclusive sense and does not exclude other elements being present. The indefinite article "a" before a claim feature does not exclude more than one of the feature being present. The invention provides a unique method and apparatus for resisting electrical shorts between support structures and high voltage powerlines and other electrical wires or conductors.

Referring to FIG. 1, pole 10 carries crossarms 12 (collectively identified as support 14) above the ground surface, although other support structures may be used, such as those constructed of steel. Insulators 16 are attached to support 14 for carrying electrified conductors such as wires 18. Dielectric material 20 is attached to selected areas of support 14 at locations close to wires 18 or other electrical system components that may be present. The areal coverage and location of dielectric material on support 20 depends on the anticipated size and reach of birds and other animals potentially in contact with wires 18 and support 14.

Dielectric material 20 is defined as any material suitable for providing insulating capability between electrified wires 18 and an electrical ground. Specifically, such insulating strength should be sufficiently great to resist short circuits when a bird or other animal contacts wires 18 and an electrical ground such as support 14. The insulating strength of dielectric material 20 can be selected based on several factors including the voltage potential between wires 18 and support 14, the type and nature of birds and animals potentially in contact therebetween, and parameters regarding the electrical conductive contact between birds and animals within potential electric short circuits. For example, parameters useful to such evaluation include the type of contact between feathered wings and wires 18 versus the gripping strength of raptor talons in contact with support 14. Such contact in dry versus humid or wet conditions also affects the amount of insulating capability desired. Such insulating capability also depends upon the selected objectives.

Dielectric material 20 is preferably in an initial liquid state before application to support 14. This embodiment facilitates application through spraying, brushing, dipping, dabbing, or other application techniques. Dielectric material 20 can comprise a single part material or multiple part material mixed before application, and can be formulated from a combination of liquid and semi-solid or solid components. An electrical power transmission system may refer to any apparatus intended to transmit power. While the disclosure is generally directed toward high voltage transmission systems such as those transmitting AC current between 10 KV and 60 KV, it will be understood that the teachings equally apply and may be adapted any suitable voltage range or any suitable transmission system. Components of the electrical power transmission system may refer to any part of the system, including support structures, transmission media, isolators, connectors, transformers, or other items known in the art. A preferred embodiment involves onsite mixing of a two part resin composition at the point of use by an applicator as will be described below.

The dielectric material 20 selected should be resistant to deterioration induced by ultraviolet light, rain, hail, temperature variations, and other environmental factors. In a preferred embodiment of the invention the dielectric material 20, although not impenetrable, is resistant to penetration by the sharp talons of birds and the teeth of animals such as squirrels and raccoons. In a preferred embodiment, a two part resin composition is used, formed from polyurethane and/or polyurea, which have strong dielectric qualities in both the liquid and solid form.

In some geographic areas, the type of birds or animals typically at risk for contact with electrical wires may shift insulating emphasis away from such animals to the protection of wire 18 and support 14 assets. In other areas wherein endangered or protected birds or animals face a greater electrocution risk, the insulating strength of the dielectric material can be selected to enhance the survivability of the birds upon contact with wires 18 and support 14. Such factors can be assessed by evaluating the bird populations in the target region having behavior likely to roost on wires 18 and support 14, the nature of such roosting habits and the physical contact likely between the birds and such components, and the type of electrical short circuits desired to be protected in view of the configuration of and voltage potential between wires 18 and support 14.

In view of these factors, the dielectric strength of dielectric material 20 can be selected to resist short circuits, to eliminate potential short circuits, or to limit the amount of current flowing through such shorts to a selected range. Whereas it may not be practical to eliminate all electrical short circuits between a bird and a wire 18 or support 14, the invention provides the efficient ability to reduce current flow to a non-life threatening level, thereby resisting electrical short circuits. The insulating capability of dielectric material 20 applied will depend on the material used as well as other parameters such as the thickness of dielectric material 20 on support 14.

In addition to installation of support 14, dielectric material 20 can also be attached to selected portions of wires 18 at locations close to support 14. Because wires 18 comprise one side of the electrical contacts necessary to create a short circuit when bridged by a bird or other animal, protection of such wires 18 further reduces the risk of short circuits. Either wires 18 or support 14 can be coated with dielectric material 20 to provide the electric insulating capability desired, and it would be possible to coat wires 18 exclusively at selected locations without applying any dielectric material 20 to support 14. Such technique would resist short circuits caused when the wings of a bird simultaneously contact adjacent electrified wires. By insulating both support 14 and wires 18, the thickness of dielectric material 20 covering either support 14 or wires 18 can be reduced while providing the desired dielectric strength within the potential short circuit path. Reductions in the requisite thickness of dielectric material 20 can be useful because less material is required and the time to install can be reduced.

The selected dielectric material 20 may be applied in sufficient locations with sufficient dielectric strength to resist electrical short circuits when a bird or other animal contacts electrified wires 18. FIGS. 2 and 3 illustrate other forms of supports 22 and 24 together with possible distribution locations for dielectric material 20.

The dielectric material 20 is distributed on the structure such as support 14 at a location close to one or more electrified wires 18 until a selected thickness of dielectric material 20 is achieved. The device for distributing dielectric material 20 can comprise a paint brush or other conventional tool appropriate for spreading or otherwise distributing dielectric material 20.

The dielectric material 20 can be selected to have sprayable or other specific applications properties. Such properties can account for temperature, humidity and other environmental factors anticipated for field application work. The difference in electric potential between electrified wire 18 and the support 14 can be evaluated before dielectric material 20 is sprayed on support 14, and the thickness of dielectric material 20 to provide a desired dielectric insulating capability can be assessed before application. Dielectric material 20 can be sprayed, brushed, or otherwise distributed on electrified wire 18 at selected locations close to support 14, and can be applied to wire 18 before wire 18 is installed on support 14 and is electrified.

One significant benefit of the invention is the flexibility and portability of the composition and installation equipment in retrofitting existing supports 14 or wires 18. Regions having bird related failures or potential for failures can be identified and targeted for application of the invention to existing powerline and other facilities. The invention accomplishes the objectives of protecting animals and reducing equipment failure while avoiding the prohibitive costs of replacing existing wires and wire supports. The invention further provides significant flexibility in application to wires and support structures having different shapes and orientations.

As the potential voltages can be around 15 KV, but typically 10 to 40 KV, the dielectric coating must be applied to a suitable thickness, for example approximately ⅛ inch, to achieve suitable protection. A suitable dielectric must have good flexibility and elongation to accommodate thermal expansion and typical movement expected from suspended wires. Therefore, in a preferred embodiment of the invention, a sprayable two part resin is used. Specifically, the two part resin may be a mixture of polyurethane and polyurea, or either may be used separately.

A description of a suitable two part resin composition will now be given. Reacting an isocyanate terminated resin material with a resin material containing reactive hydroxyl sites produces polyurethane. Reacting an isocyanate terminated resin with a resin material containing reactive amine sites produces polyurea. Polyurea generally has a more rapid cure time, higher temperature resistance, and a higher cost than polyurethane. The dielectric material 20 is preferably a polyurethane/polyurea hybrid coating. It is applied in a liquid state and polymerizes in about 30 seconds, depending on conditions, to produce a tough elastic coating on the surface to which it is applied. The product provides excellent insulation in both the liquid and solid state. This allows application directly to electrified structures. The coating contains no solvents and so poses little or no damaging effects to the environment when properly applied. The product also allows the user to apply thicker coatings or multiple layers easier than the products used in the prior art, since the product cures quickly to a stable state, such that other layers may be applied directly.

The coating provides excellent resistance to movement and thermal expansion. It can be easily repaired if damaged and can be stripped from the wire where splicing is required. Furthermore, the coating can be modified with fluorescent pigment for added visibility and safety marketing on overhead power lines in work areas. It can also be formulated with phosphorescent pigments to provide visibility during the night.

Application is performed using plural component equipment with sufficient metering of each component to maintain the correct ratio. Each component is delivered independently to a mix chamber prior to being deposited on the surface to be coated. Once applied, the coating achieves 90% of its properties within seconds, and so is not easily affected by rapid weather changes.

Figure 4:
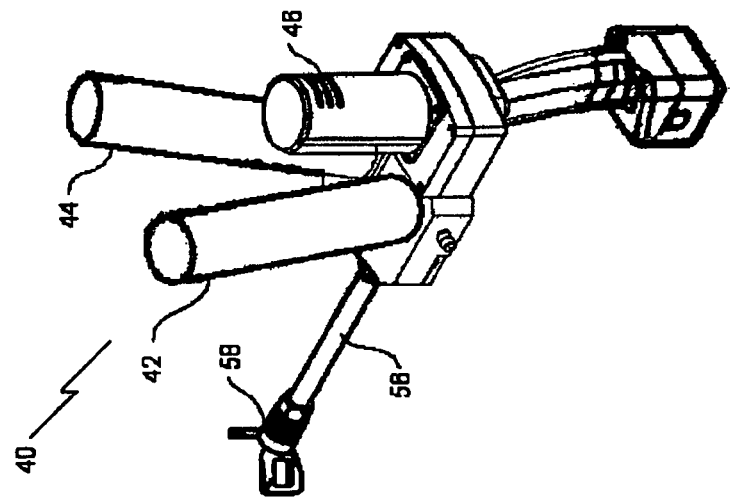
FIG. 4 is a perspective view of an applicator.
Figure 6:
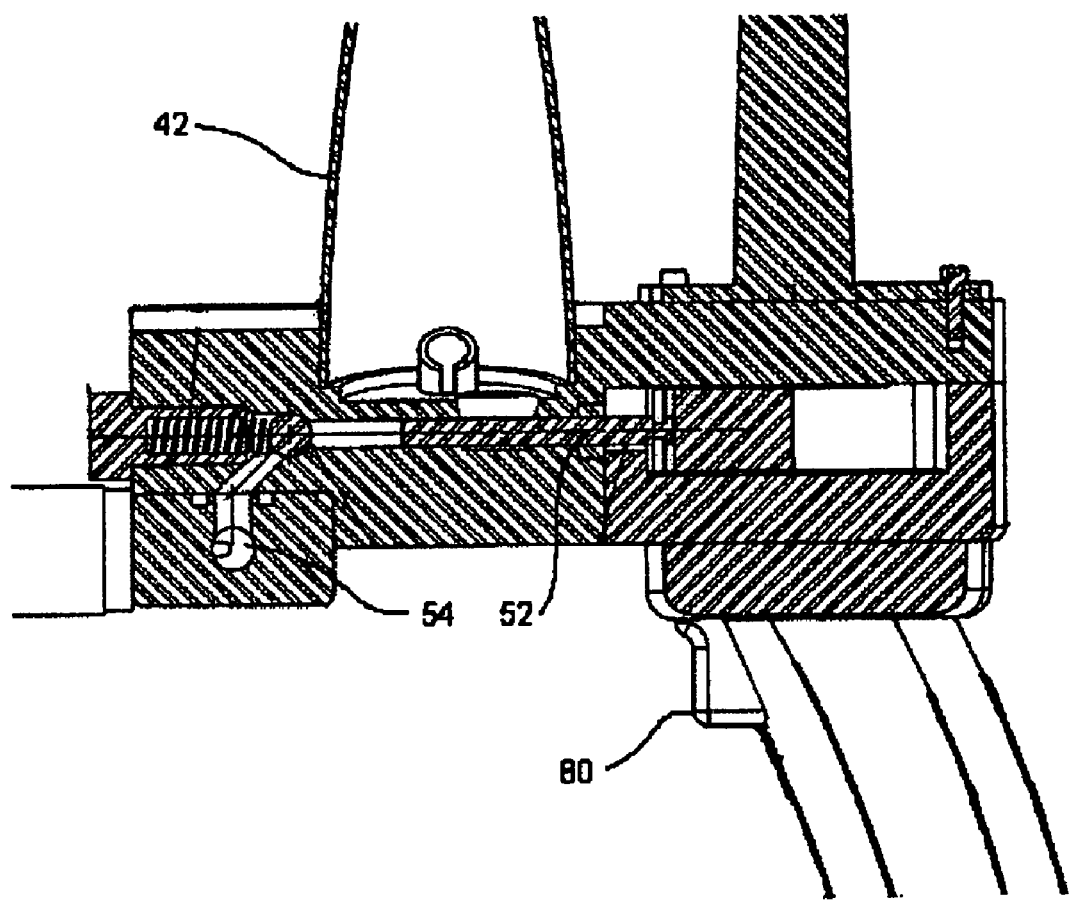
FIG. 6 is an exploded side elevation view in section of the applicator illustrated in FIG. 4.

An example of a suitable two part resin is sold under the name "GreenJacket". GreenJacket is a 100% solids high performance polyurethane/polyurea elastomer. GreenJacket is designed to provide electrical insulation in a wide variety of industrial applications where toughness and abrasion resistance are required, and is resistant to water and a wide variety of chemicals. GreenJacket is a fast set system intended for use with plural component spray equipment with a mix ratio of 1 to 1. The following are some properties of the resin:

Density 1.10 g/mL
Service Temp. −50° C. to 250° C.
Shore hardness 45 D/97 A
Elongation 170%
Tensile Strength 2300 psi
Dielectric Strength 40 KV/125 mils
  (After 1000 hours QUV)
Elongation 110%
Tensile Strength 1600 psi Referring now to FIGS. 4 through 6, an example of an applicator will be discussed. Referring to FIG. 4, there is shown an applicator 40, which is portable and therefore can be taken to an electric power sub-station to apply the coating. A first supply chamber 42 and a second supply chamber 44 each supplies a part of the two part resin composition. First and second supply chambers 42 and 44 are designed to hold a certain amount of fluid required to make the resin coating. For example, first supply chamber 42 may supply an isocyanate terminated resin material, and second supply chamber 44 may supply a mixture of a resin material containing reactive hydroxyl sites and a resin material containing reactive amine sites. The ratio of the two components in the second supply chamber 44 will determine the ratio of polyurethane to polyurea in the two part resin composition. A pump 46 is included to drive fluid from supply chambers 42 and 44 to a static mix tube 56. Referring to FIG. 5, pump 46 as illustrated includes an electric motor 48 which drives pistons 52. Referring to FIG. 6, pistons 52 are in fluid communication with supply chambers 42 and 44. As pistons 52 move back and forth as driven by motor 48, liquid is driven from supply chambers 42 and 44, which feed pistons 52 by gravity, through conduits 54, and into static mix tube 56. Referring to FIG. 5, the combined fluids are then driven through static mix tube 56 where they are mixed to obtain a reasonably homogeneous mixture, and out a delivery subsystem, in this case, nozzle 58. Static mix tube 56 may simply be a hollow tube that is long enough to allow for the two components, which are under high pressure, to mix. Other types of static mix tubes may be used, such as those with baffles, which would allow the components to mix bore thoroughly. Once the liquids mix, the two part resin composition will begin to cure. As illustrated, applicator 40 is designed to be handheld, and is activated by squeezing a trigger 60, such that the user can control the flow of fluid, and can apply a sufficiently thick layer of the liquid composite to achieve the desired dielectric constant. The two part resin composition formed of polyurethane and polyurea that may be used is proportionately mixed such that it has strong dielectric properties in both the liquid and solid form, while maintaining favorable properties in its solid form. Applicator 40 as described is intended for use as a portable, cordless applicator that can be taken into the field by a worker, when only a relatively small area need to be covered, for example, 5 to 10 square feet. Supply chambers 42 and 44 are removable so that refills may be installed.

Figure 7:
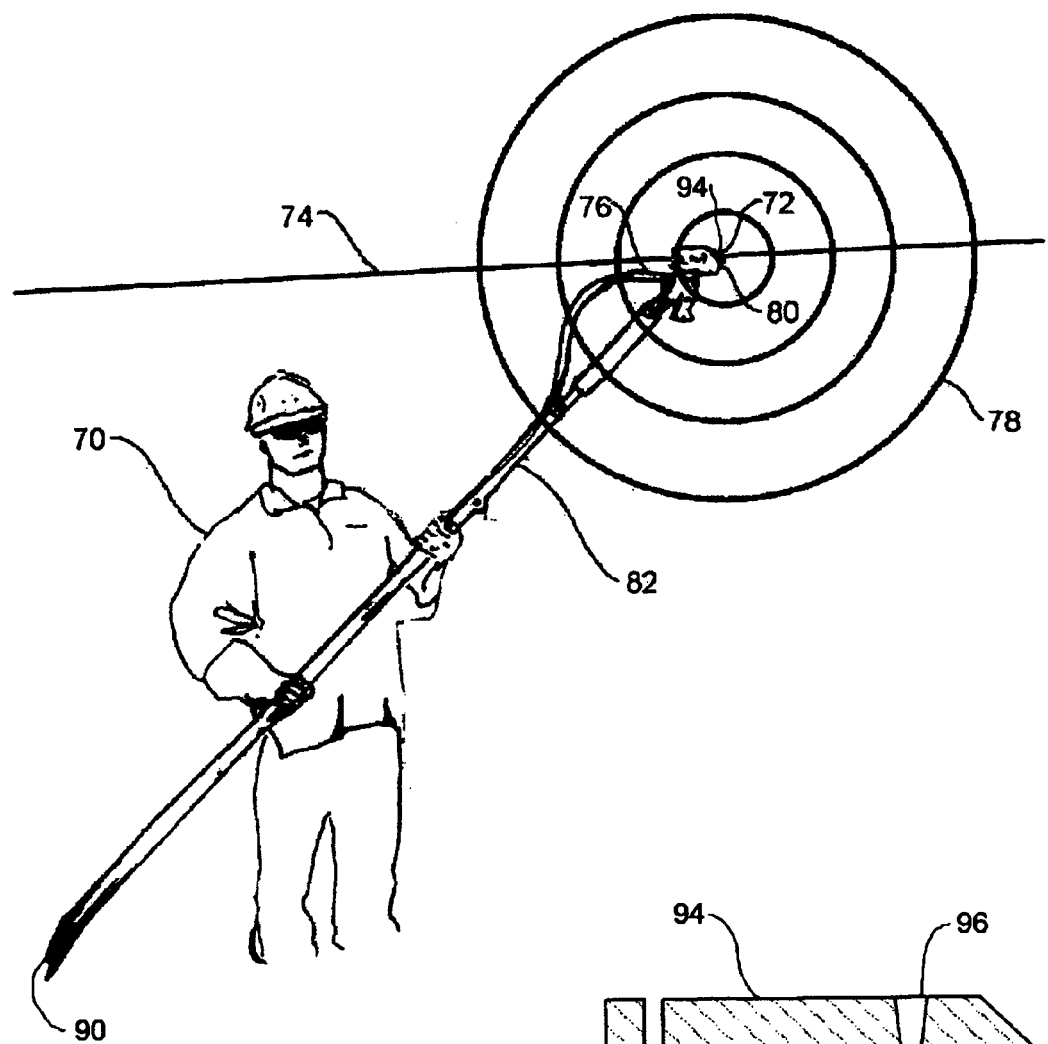
FIG. 7 shows the two part resin composition being applied to the high voltage electrical wires.
Figure 10:
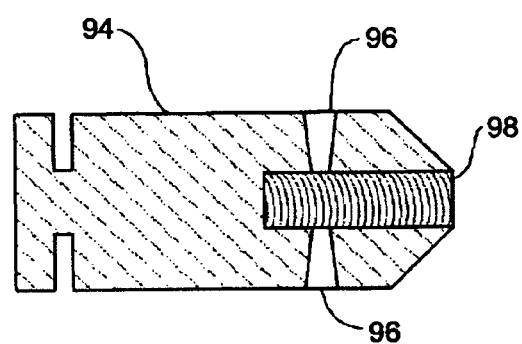
FIG. 10 is a side view in section of an atomizing nozzle.
Figure 8:
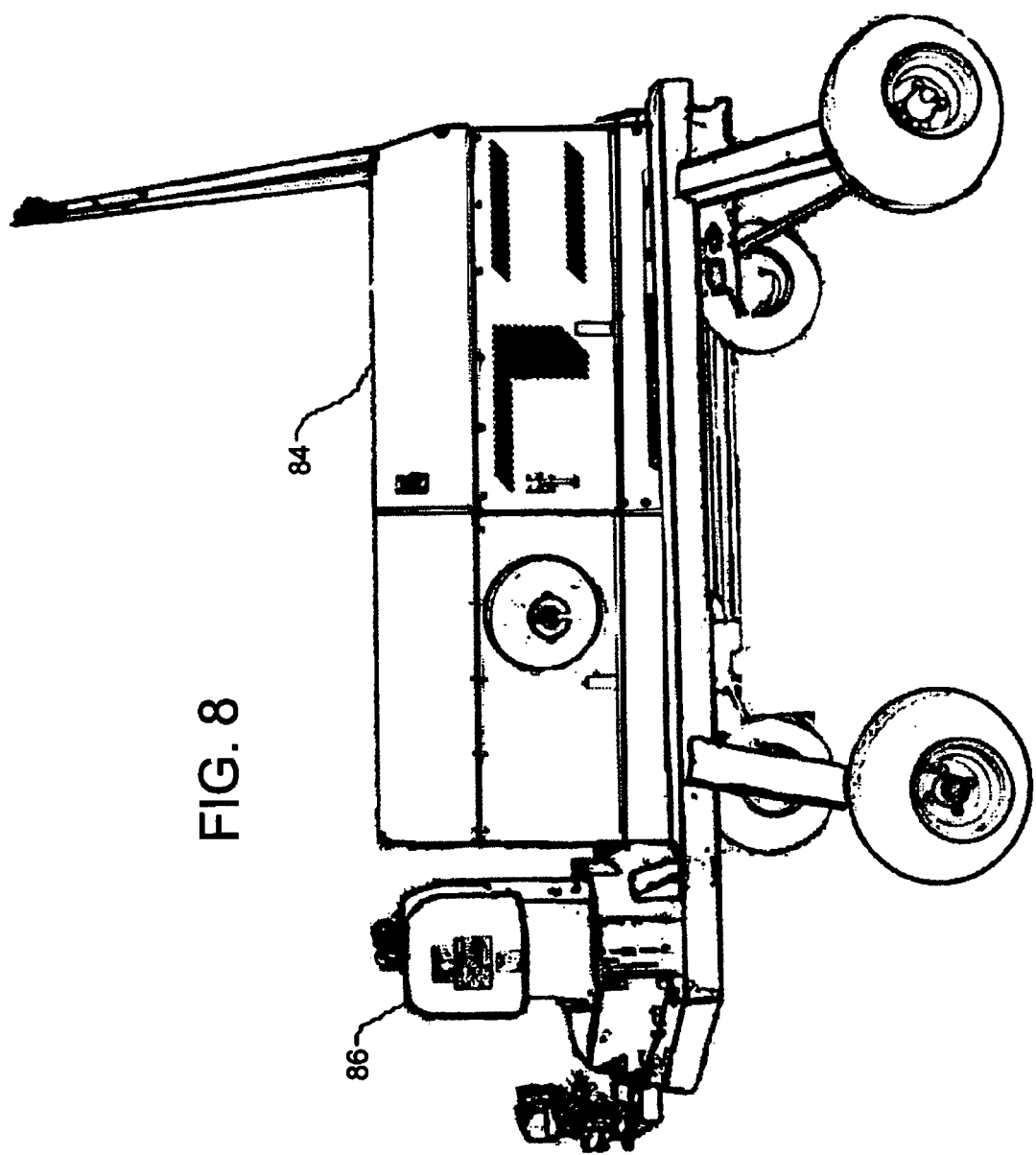
FIG. 8 is a side plan view of a supply system for supplying two-part resin to the applicator.
Figure 9:
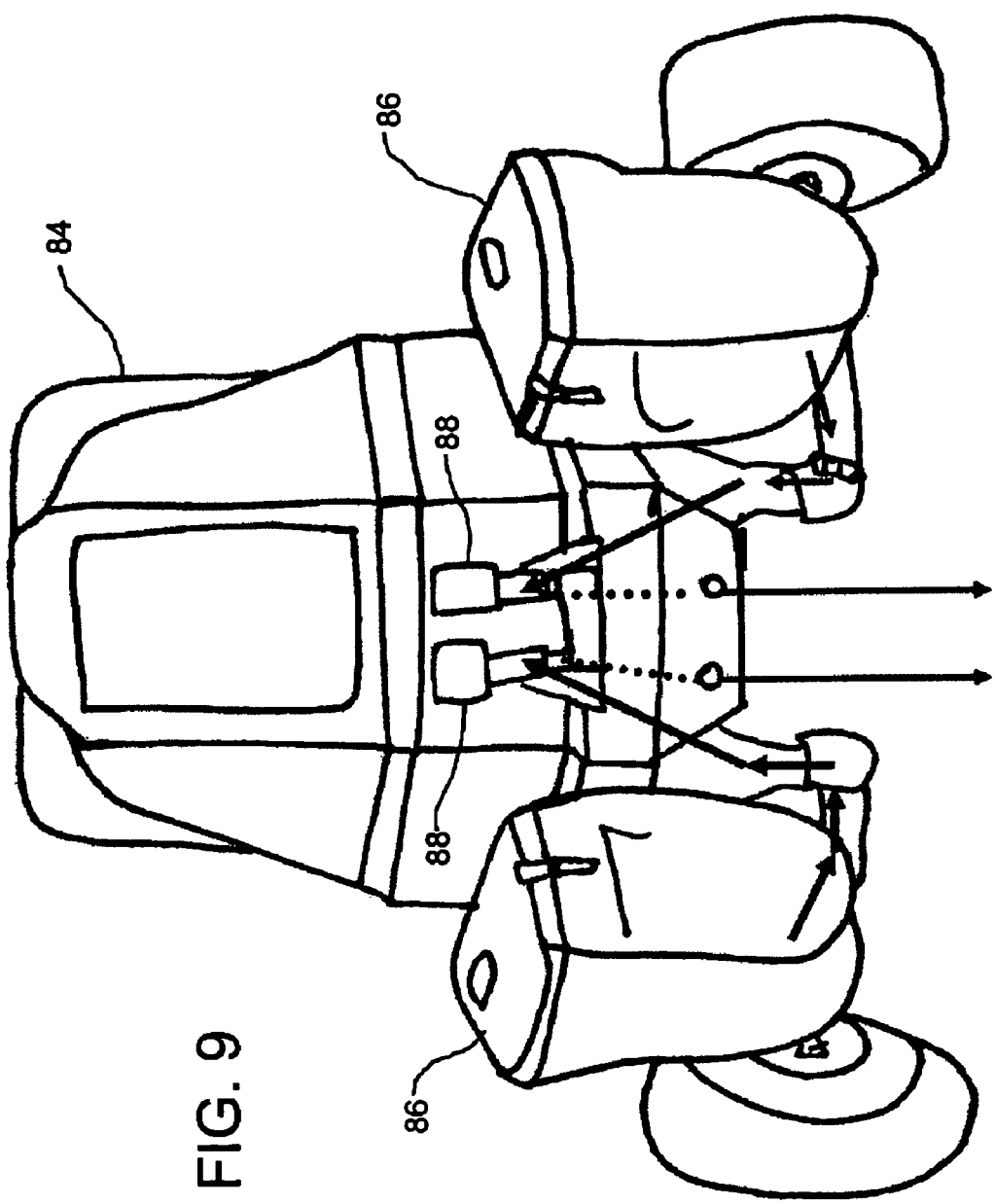
FIG. 9 is a front plan view of the supply system of FIG. 8.

The invention as described provides a method for protecting energized overhead high-voltage power lines and associated equipment from damage, increasing power system reliability, and protecting against accidental electrocution death of birds and other animals including endangered species, by applying a coating of electrical insulation to selected target areas of the power system that previously did not have electrical insulation. The insulation is applied in liquid form without the need to de-energize the power system, thereby avoiding the need to create a power outage for customers of the electric utility. A further discussion of the steps involved will now be given. The steps include determining the bare target or targets that are to be coated with insulation, each of which may be energized such as a conductor or other energized component, the size of each target, and the voltage of the energized components. A dielectric material is selected with sufficient dielectric strength to safely withstand said voltage in both its liquid state and solid state, and the thickness of dielectric material coating required is determined based on the voltage. An applicator is selected from a variety of types which is appropriate for distributing material onto the target or targets, and the device, which is a mobile insulation application system, is assembled. Referring to FIGS. 7 through 10, the device is made up of the following components:

a supply system 84 shown in FIG. 8 that remains on the ground at ground potential and which can be mobile-mounted on a cart as shown, or in a truck or on a trailer. Referring to FIG. 9, the supply system 84 comprises tanks 86 for holding the supply of liquid dielectric material components and pumps 88 powered by a suitable power system to pressurize the material, where the arrows show the flow of two the two separate components;

referring to FIG. 7, hoses 90 which is a flexible or rigid line that is a means of moving the liquid dielectric material from the supply system to the wand 82;

referring to FIG. 7, a long wand 82 having sufficient length and dielectric strength to enable the applicator end to be energized at said voltage and the base end connected to the supply to remain at ground potential and to be gripped at the base end by a lineman 70 who operates the wand and who can remain outside the approved safe working distance from energized powerline 74 or other components. The wand 82 has two separate passageways to keep the two components separated until they reach applicator 76. There is also a manually-operated valve 92 in the wand allowing lineman 70 to stop and start the flow of dielectric material;

an applicator 76 that is engaged with the head end of the wand 82 and that is used to distribute the liquid dielectric material 72 onto the powerline 74. While many types of applicators exist, such as applicators for extruding, dipping, dabbing, brushing, spaying and other types, an atomizing nozzle 94 is preferable when working with the two component material discussed above. Referring to FIG. 10, atomizing nozzle 94 has entry ports 96 for each component. Entry ports 96 are on the order of $20/1000$ of an inch, such that each components under high pressure will atomize when exiting the port 96. The barrel 98 of nozzle 94, which acts as the mix chamber 80, can be rifled or etched to obtain a better mixture and to help the mixture exit the nozzle 94. It will be understood that a uniform coating around the entire wire is not required, merely those area that pose a risk of being shorted.

a leakage current monitor may be included to for safety purposes to detect the amount of current travelling through the apparatus when applying the liquid dielectric material to energized components.

The supply system 84 is then grounded. The device tanks 86 are filled and the entire device is charged including the supply system, hose, wand and applicator with the components of the dielectric material. It is prudent to measure leakage current through the wand with the applicator end energized and the base end grounded and ensuring said current is within approved limits for safe work practices. A lineman 70 is positioned near the work area which can be on the utility structure, in a truck boom bucket, other aerial device or work platform. The lineman 70 must maintain a safe distance from the energized components that complies with typical utility hotstick live line work practices, and where the lineman 70 may be at ground potential. The lineman 70 uses a hotstick live line work practices to manipulate the wand, manipulates the valve to start the flow of liquid dielectric material through the wand and out the applicator; and distributes the liquid dielectric material onto the target or targets to the determined thickness. Once the desired thickness is achieved, the valve is switched to stop the flow of liquid dielectric material. After waiting a period of time for the liquid dielectric material to cure into a solid state, a coating of solid electrical insulation on the target is achieved.

For safety purposes, the lineman should be positioned such that he is insulated from ground and is at high impedance from both ground and the energized components, such as in an insulated aerial device such as a bucket on an insulated truck boom, or similar insulated work platform. The hose should also have sufficient dielectric strength to enable the lineman to remain insulated from ground while he is in contact with the elevated end of the hose where it is engaged with the base end of the wand, while the lower end of the hose remains at ground potential since it is engaged with the grounded supply system. The hose is cleaned of contaminants prior to its use to ensure the hose performs at its dielectric rating. Alternatively, the lineman may use rubber glove live line work practices instead of hotstick live line work practices, thus enabling the lineman to work within arm's length distance of energized components. In addition, the liquid dielectric material may be distributed using a short wand that itself does not have dielectric strength and therefore may be energized in its entirety when its applicator comes into contact with energized components, and where the wand retains all of the other attributes and functions of the long dielectric wand described above. The target need not be energized, but may be components of the structure bearing the energized components, where the target is close to the energized components and at ground potential or electrically insulated from ground by some impedance, however the safety precautions should still be taken.

Referring now to FIG. 7, a lineman 70 is shown applying liquid dielectric material 72 to an energized powerline 74 using a two component applicator 76. Lines 78 represent the limits of approach (LOA) designated for high voltage powerlines. Liquid dielectric material 72, in this case, a two part resin composition, is mixed within the LOA 78, while lineman 70 is outside, holding an application rod that has applicator 76 at one end and the component supplies (not shown) at the other. As two part resin composition 72 cures quickly, mixing at the end of the applicator is required to avoid curing within the applicator if the cure time is too short, and to prevent composition 72 from sagging on the powerline 74 if the cure time is too long. Therefore, there is a mix chamber 80 where the two parts are atomized and combined. To improve atomization, it may be desirable to inject pressurized gas such as compressed air or nitrogen into each part of the resin prior to mixing. Compressed air may also be used to blow out the equipment after use as a maintenance technique. The use of compressed air or nitrogen may require additional equipment drying techniques. The arrangement shown in FIG. 7 can be easily modified to apply composition 72 to other structures, such as substations, support structures, insulators, or other electrical components. During application, there may be certain areas that should not be coated. If this is the case, temporary masks or blinds may be installed to protect those areas.

The liquid dielectric material may be comprised of multiple liquid constituents which are mixed in the applicator prior to application to the target. This requires a corresponding number of tanks and pumps in the supply system and hoses and pipes within the wand to carry the constituents to the applicator. Each liquid constituent has sufficient dielectric strength to enable application to energized targets while the supply system remains grounded. A preferred embodiment involves two liquid constituents, and the ratio of one constituent to the other is maintained by the supply system at 2 to 1 or 1 to 1.

Immaterial modifications may be made by those skilled in the art without departing from the invention as described herein.

We claim:

1. A method of protecting electrical power transmissions systems from damage, the method comprising the steps of:
   mixing a two part resin composition at the point of use to form a dielectric liquid composite;
   applying the dielectric liquid composite to an electrified component of an electrical power transmission system; and
   curing the liquid composite to form a coating for the component, the liquid composite curing sufficiently in less than 30 seconds to prevent sagging of the coating.

2. The method of claim 1 carried out at an electric power sub-station using portable equipment.

3. The method of claim 1 in which the first part of the two part resin composition comprises at least one of a hydroxyl terminated resin and an amine terminated resin and the second part of the two part resin composition is an isocyanate terminated resin.

4. The method of claim 1 in which the electrical power transmission system conducts voltages between 10 KV and 60 KV.

5. The method of claim 1 further comprising the step of calculating a desired dielectric constant of the coating and applying a corresponding thickness of the liquid composite.

6. The method of claim 1 in which applying the liquid composite comprises using an applicator comprising:
   a mix chamber;
   a first supply for a first part of a two part resin composition, the first supply communicating with the mix chamber;
   a second supply for a second part of the two part resin composition, the second supply communicating with the mix chamber;
   pumps for driving fluid from the supplies into the mix chamber; and
   a delivery subsystem for receiving fluid from the mix chamber.

7. The method of claim 1 in which applying the liquid composite to an electrified component of an electrical power transmission system comprises using an applicator comprising:
   an application rod having an application end and a supply end, the application rod adapted to allow the application end within the limits of approach of the electrified component while a user remains outside the limits of approach of the electrified component;
   a mix chamber connected to the application end of the application rod;
   a first supply for a first part of a two part resin composition, the first supply communicating with the mix chamber;
   a second supply for a second part of the two part resin composition, the second supply communicating with the mix chamber, the first and second supplies connected to the supply end of the application rod;
   pumps for driving fluid from the supplies into the mix chamber; and
   a delivery sub-system for receiving fluid from the mix chamber at the application end of the application rod.

8. The method of claim 7 in which using an applicator further comprises the step of maintaining the supply end of the applicator at ground potential.

9. A method of protecting electrical power transmissions systems from damage, the method comprising the steps of:
   identifying an electrified area of the electrical power transmissions system to be protected;
   selecting a dielectric material having a liquid form and a solid form, where the dielectric material has dielectric properties suitable for protecting the identified areas in the solid form, and where the dielectric material has dielectric properties suitable to allow for safe application in the liquid form;
   applying the dielectric material in the liquid form to the identified electrified area; and
   allowing the dielectric material to convert from the liquid form to the solid form, the dielectric material curing sufficiently in less than 30 seconds to prevent sagging of the solid form.

10. The method of claim 9, wherein applying the dielectric material in liquid form further comprises the use of an applicator, the applicator comprising a dielectric material supply connected to a delivery sub-system.

11. The method of claim 10, wherein the supply end of the applicator is maintained at ground potential.

12. The method of claim 9, wherein the dielectric material comprises a two part resin composition, where the first part of the two part resin composition comprises at least one of a hydroxyl terminated resin and an amine terminated resin and the second part of the two part resin composition is an isocyanate terminated resin.

13. The method of claim 9 in which the electrical power transmission system conducts voltages between 10 KV and 60 KV.

14. The method of claim 9, wherein the use of an applicator comprises using an applicator comprising:
   a mix chamber;
   a first supply for a first part of a two part resin composition, the first supply communicating with the mix chamber;
   a second supply for a second part of the two part resin composition, the second supply communicating with the mix chamber;
   pumps for driving fluid from the supplies into the mix chamber; and
   a delivery sub-system for receiving fluid from the mix chamber.

15. The method of claim 9 wherein applying the dielectric material further comprises the step of monitoring leakage current levels.

* * * * *